Figure 1:
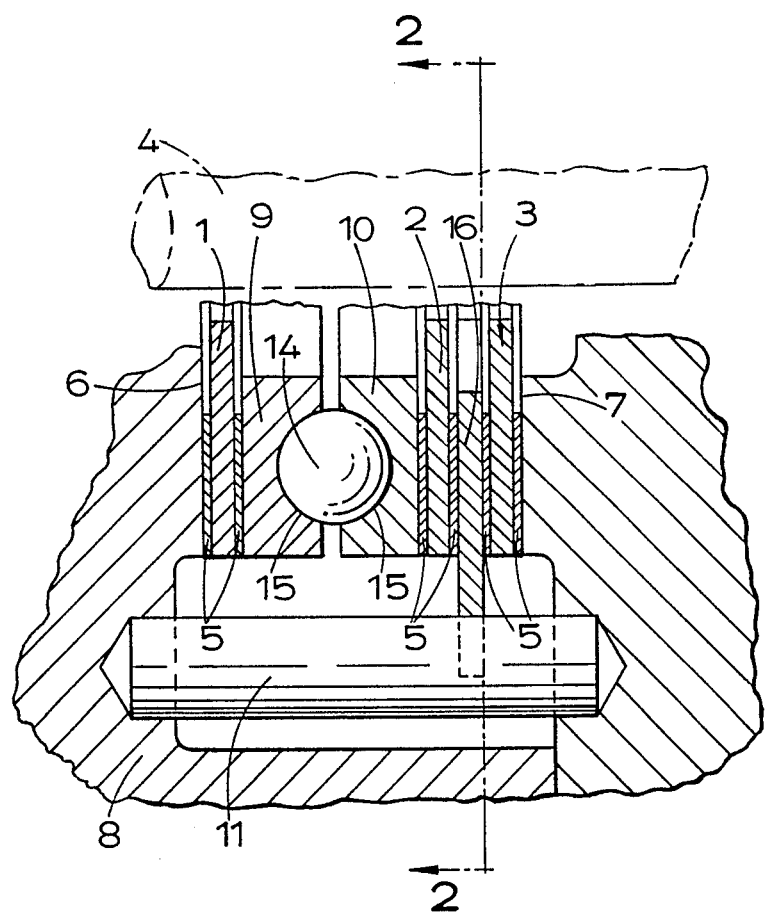

United States Patent [19]

Price et al.

[11] Patent Number: 4,796,730
[45] Date of Patent: Jan. 10, 1989

[54] SELF-ENERGIZING DISC BRAKES

[75] Inventors: Anthony G. Price, Gwent, Wales; Roy Campbell, Worcestershire, England; Eric Henson, Gwent, Wales

[73] Assignee: Lucas Industries, Ltd., Birmingham, England

[21] Appl. No.: 3,056

[22] Filed: Jan. 13, 1987

[30] Foreign Application Priority Data

Nov. 6, 1986 [GB] United Kingdom ............... 8626522

[51] Int. Cl.[4] .................... F16D 55/02; F16D 65/78
[52] U.S. Cl. ................................. 188/71.6; 188/72.7; 188/264 A; 192/70.12
[58] Field of Search ............... 188/71.6, 72.7, 72.2, 188/71.5, 264 A, 264 AA, 264 C, 251 A, 71.4, 72.9; 192/113 A, 70, 70.12, 107 M

[56] References Cited

U.S. PATENT DOCUMENTS

| 4,036,333 | 7/1977 | Mathauser .................. 188/264 A |
| 4,262,788 | 4/1981 | Yamamoto et al. ......... 188/251 A X |
| 4,356,901 | 11/1982 | Koehler et al. .............. 188/71.5 X |
| 4,522,290 | 6/1985 | Klink ............................ 188/251 A X |
| 4,629,047 | 12/1986 | Lu ................................ 192/113 A X |
| 4,641,731 | 2/1987 | Kawaguchi et al. ..... 188/264 AA X |

FOREIGN PATENT DOCUMENTS

| 0188339 | 7/1986 | European Pat. Off. .......... 188/72.7 |
| 0041312 | 4/1979 | Japan ............................... 188/251 A |
| 0302527 | 6/1971 | U.S.S.R. ......................... 188/264 A |

Primary Examiner—Andres Kashnikow
Assistant Examiner—Richard Potosnak
Attorney, Agent, or Firm—Oldham & Oldham Co.

[57] ABSTRACT

In a self-energizing disc brake of the spreading type, an intermediate metal plate located between the friction linings on an adjacent pair of rotatable friction discs includes portions which project radially with respect to the linings, and the portions include slots which define fins to facilitate cooling.

7 Claims, 2 Drawing Sheets

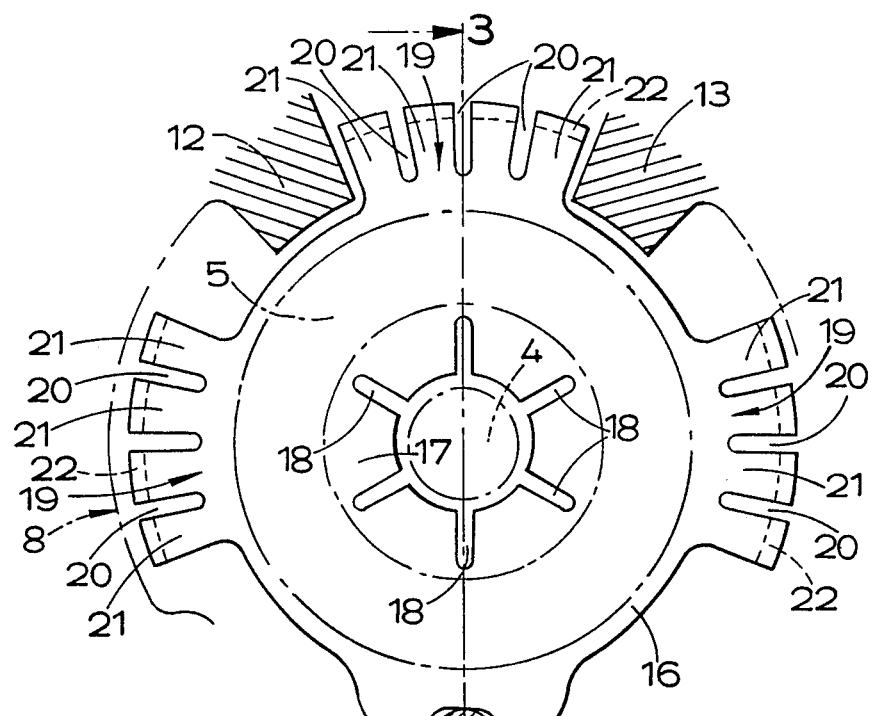
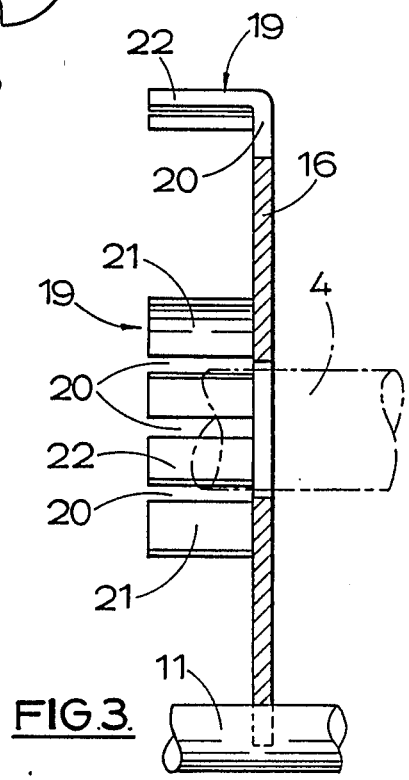
FIG. 2.
FIG. 3.

SELF-ENERGIZING DISC BRAKES

This invention relates to self-energising disc brakes of the kind in which rotatable friction discs provided with linings of friction material are adapted to be brought into engagement with spaced opposed braking surfaces in a housing by an actuator mechanism comprising pressure plates located between the friction discs and centred by stationary pilot lugs, and balls or rollers located in co-operating oppositely inclined recesses in the adjacent faces of the pressure plates, the application of the brake is initiated by moving the pressure plates angularly in opposite directions, and the pressure plates then move apart, due to the tendency for the balls or rollers to ride up ramps defined by the edges of the recesses, and into engagement with the friction discs which are urged into engagement with the braking surfaces, the pressure plates being carried round with the friction discs until one is arrested by the engagement of a lug on the plate with a drag-taking stop abutment in the housing, and the continued angular movement of the other pressure plate providing a servo action.

Self-energising brakes of the kind set forth may be dry or they may be of the liquid cooled type, and such brakes are commonly used in tractors and like vehicles and are hereinafter called brakes of the kind set forth.

In some brakes of the kind set forth at least two friction discs are disposed between the actuator mechanism and the adjacent braking surface, and a non-rotatable intermediate spacer disc is disposed between the adjacent linings of those discs, the spacer disc comprising a metal plate keyed to the housing for relative sliding movement in an axial direction.

In brakes of the kind set forth it is preferred to construct the linings from organic non-metallic materials rather that from inorganic metallic materials. For example the linings may be constructed by powder, moulding or felting techniques. Typically powder is applied to sintered material, moulding to resin, and felting to paper. Such organic material has a relatively high co-efficient of friction ($\mu$) and is relatively quiet in operation whereas conventional inorganic metallic, suitably sintered, material has a relatively low ($\mu$) and is relatively noisy in operation.

It is a problem, however, that in brakes of the kind set forth which incorporates at least one intermediate spacer disc, excessive wear of non-metallic linings co-operating with the spacer disc may take place when the linings are subjected to high energy braking of long duration.

According to our invention in a disc brake of the kind set forth an intermediate spacer disc is disposed between the adjacent linings of a pair of friction discs on one side of the actuator mechanism, and the intermediate disc comprises a stationary metal plate of which the area is greater than the area of each lining, portions of the plate which project radially with respect to the lining including slots to define fins which assist cooling.

Increasing the cooling effect of the intermediate disc cools the friction discs and therefore acts to increase the wear life of the linings, both directly and indirectly. This is of particular significance when the linings are of non-metallic organic material.

Preferably radial portions of the intermediate disc project radially outwards into spaces defined in the housing between adjacent pilots, and such portions are slotted inwardly from their outer edges. In such a construction, axially extending flange portions may extend axially from the outer ends of the radial portions, with such flange portions lying outside the peripheral edges of the friction discs.

Alternatively, or in addition, the intermediate disc projects radially inwardly to form an annular region of which a clearance is provided between its inner edge and a shaft on which the rotatable discs are normally splined for axial sliding movement.

One embodiment of our invention is illustrated in the accompanying drawings in which:

FIG. 1 is a longitudinal section through a portion of a brake of the spreading type; and FIG. 2 is a section on the line 2—2 of FIG. 1; and FIG. 3 is a section on the line 3—3 of FIG. 2

The brake illustrated in the drawings is of a spreading type in which three rotatable friction discs 1, 2, 3 are splined for sliding movement on a rotatable shaft 4. Each disc is provided on opposite sides with linings 5 of a non-metallic friction material adapted to be brought into engagement with spaced opposed radial surfaces 6, 7 in a housing 8 by pressure plates 9, 10 located between an adjacent pair of the discs 2, 3 and centred by three angularly spaced stationary pilots 11, 12, 13 of which one is shown as comprising a pin 11. Balls 14 are located in co-operating oppositely inclined recesses 15 in the adjacent faces of the pressure plates 9, 10. An intermediate disc assembly 16 is disposed between the adjacent linings 5 of the two discs 2 and 3. The disc 16 comprise a planar metal plate keyed against rotation by means of the pin 11.

As illustrated the plate 16 projects inwardly of the linings 5 on the discs 2 and 3 to form an annular margin 17 which is provided with a plurality of angularly spaced radial cooling slots 18 which extend inwardly from the edge of the margin 17 but terminate short of the linings 5. Also the plate 16 is provided with three angularly spaced cooling regions 19 which project radially outwards into spaces in the housing which are defined between the adjacent edges of pairs of the pilots 11, 12 and 13. Each region 19 is also provided with a plurality of angularly spaced radial cooling slots 20 which extend inwardly from the outer edges of the region 19, but, again, terminate short of the linings 5. Cooling fins 21 are defined between each pair of slots 20, and between the ends of each region 19 and the adjacent slot 20. Each fin 21 has an axially extending flange portion 22 which lies outside the peripheral edge of the disc 2. The flange portions 22 extend towards the pressure plate 10 and lie on a pitch circle of constant diameter. The flange portions 22 act to increase the cooling effect of the fins. All the slots 18 and 20 lie outside the braking path defined by the area of the plate 16 which is swept by the friction linings 5. This ensures that the linings do not contact the slots 18 and 20.

The application of the brake is initiated by moving the pressure plates 9, 10 angularly in opposite directions which causes the pressure plates 9, 10 to move axially relatively away from each other due to the tendency for the balls 14 to ride up ramps defined by the end faces of the recesses 15. This urges the frictions discs 1 and 3 into engagement with the radial surfaces 6 and 7 on the housing 8. The pressure plates 9 and 10 are then carried round with the discs 1, 2 and 3 until one is arrested by the engagement of a lug on a respective plate with a drag-taking abutment, suitably the pin 11, whereafter continued angular movement of the other plate provides a servo action.

When the brake is applied the brake applying force is transmitted from an actuator mechanism comprising the pressure plates 9 and 10, and the balls 14, through the disc 2 and the intermediate disc 16, to the disc 3.

During the application of the brake the intermediate disc acts to facilitate cooling of the linings 5, thereby increasing their wear life. The slots 20, besides defining the fins which facilitate cooling, also act as anti-coning slots for the intermediate disc, with the anti-coning effect being increased by the presence of the flange portions 22.

We claim:

1. A self energizing disc brake comprising a housing, first and second axially spaced braking surfaces in said housing, radial pilot lugs and a drag-taking stop abutment in said housing, an actuator mechanism comprising first and second pressure plates centered on said pilot lugs, adjacent faces of said pressure plates being provided with co-operating oppositely inclined angularly spaced recesses, and rolling bodies located in complementary pairs of said recesses, at least one rotatable friction member disposed between each said pressure plate and an adjacent said braking surface, each said friction member comprising a disc, and first and second linings of friction material for engagement with said pressure plate and said braking surface carried by opposite faces of said discs, said linings having outer peripheral edges, and said pressure plates being movable angularly relative to said housing to initiate application of said brake with said pressure plates also moving axially to urge said friction members into engagement with said braking surfaces due to a tendency for said rolling bodies to ride up ramps defined by said end faces and constituting camming means, said plates being carried round with said discs until one of said plates is arrested by the engagement of a lug on that plate with said drag-taking stop abutment, whereafter continued angular movement of the other of said plates provides a servo action, wherein an intermediate spacer disc is disposed between adjacent linings of a pair of said friction discs on one side of said actuator mechanism, and said intermediate disc comprising a metal plate of which the area is greater than the area of each said lining, means keying said plate to said housing against rotation relative thereto, portions of said plate projecting radially with respect to the linings each include a plurality of angularly spaced radial slots, fins which assist cooling being defined between said slots, and wherein each said fin is disposed outwardly of said outer peripheral edges of said linings.

2. A disc brake as claimed in claim 1, wherein radial portions of said intermediate disc project radially outwards into spaces defined in said housing between adjacent pilots, said radial portions having outer edges and being slotted inwardly from said outer edges.

3. A disc brake as claimed in claim 2, wherein axially extending flange portions extend axially away from said outer edges of said radial portions, and said flange portions lie outside the peripheral edges of said friction discs.

4. A disc brake as claimed in claim 3, wherein said flange portions extend towards said actuator mechanism.

5. A disc brake as claimed in claim 1, wherein said intermediate disc projects radially inwards of said adjacent friction linings to from an annular region, and said annular region has an inner edge, a clearance being provided between said inner edge and said shaft, and said region being slotted outwardly from said inner edge.

6. A disc brake as claimed in claim 1, wherein said intermediate disc projects both radially inwards and radially outwards with respect to said adjacent friction linings to define inner and outer radial portions, said inner portion having an inner edge from which said inner portion is slotted inwardly, and said outer portions having an outer edge from which said outer portion is slotted inwardly.

7. A disc brake as claimed in claim 1, wherein said linings of said friction discs are constructed from a non-metallic organic material.

* * * * *